US006364287B1

(12) United States Patent
Rauch et al.

(10) Patent No.: US 6,364,287 B1
(45) Date of Patent: Apr. 2, 2002

(54) ELECTRONIC THROTTLE RETURN SPRING ASSEMBLY

(75) Inventors: James R. Rauch, Grass Lake; Takashi Yokozuka, Novi, both of MI (US); Shinichi Hagiwara, Isesaki (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/633,313

(22) Filed: Aug. 7, 2000

(51) Int. Cl.[7] .................................................. F16K 1/22

(52) U.S. Cl. .................. 251/305; 251/337; 137/315.22

(58) Field of Search ................................ 251/305, 336, 251/337, 129.11, 129.12, 70; 137/15.25, 315.22

(56) References Cited

U.S. PATENT DOCUMENTS

RE30,135 E * 11/1979 Fitzwater et al. ................ 74/2
6,070,852 A * 6/2000 McDonnell et al. ... 251/129.11

* cited by examiner

*Primary Examiner*—Kevin Shaver
*Assistant Examiner*—Patrick Buechner
(74) *Attorney, Agent, or Firm*—Scott M. Confer

(57) ABSTRACT

Disclosed herein is a throttle return spring assembly for use in an electronic throttle unit having a throat and a valve rotatably fixed within the throat to close and open the throat. The throttle return spring assembly includes a shaft extending along a rotation axis and connected to the valve for opening and closing the throat of the throttle. A return spring has a first leg connected to the shaft and a second leg extending axially into an opening of a guide. The guide allows rotation of the return spring about the rotation axis and restricts lateral translation of the return spring. The guide has an arcuate inner radial wall defining a catch projecting radially inward. The return spring is wound by rotating the second leg to follow the arcuate surface and engage the catch. A special winding tool having a radial slot which engages the second leg can be piloted about the end of the shaft to wind the return spring. A dust cap covers the return spring and has an integral stop member to prevent the return spring from disengaging the catch and uncoiling.

12 Claims, 4 Drawing Sheets

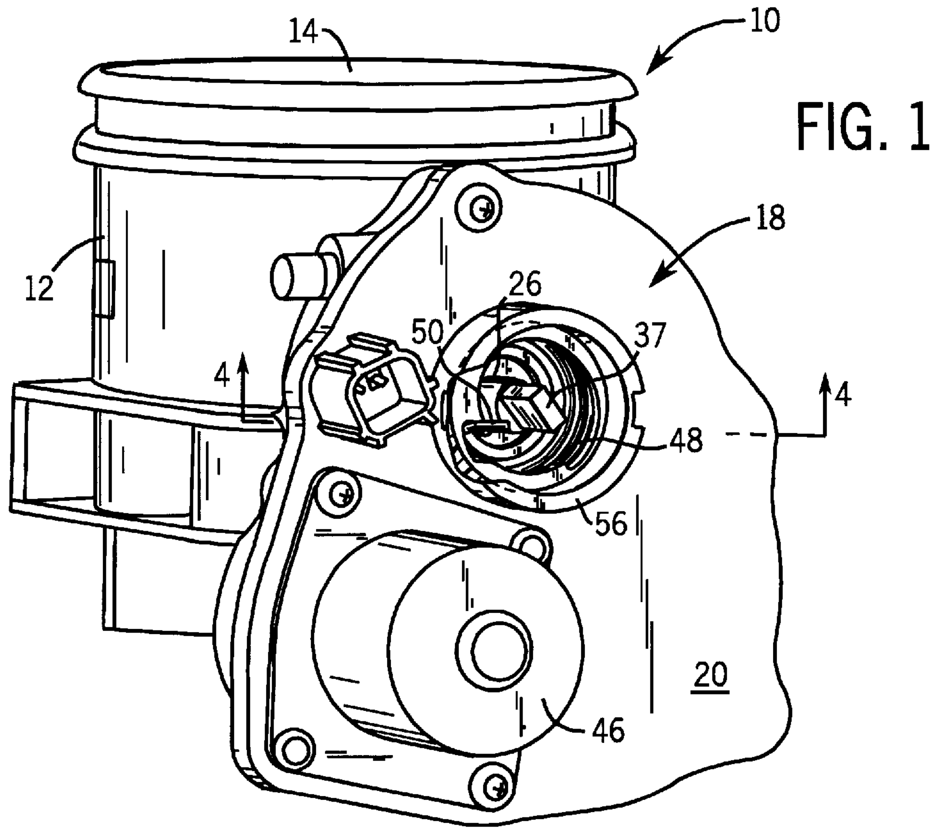
FIG. 1
FIG. 3
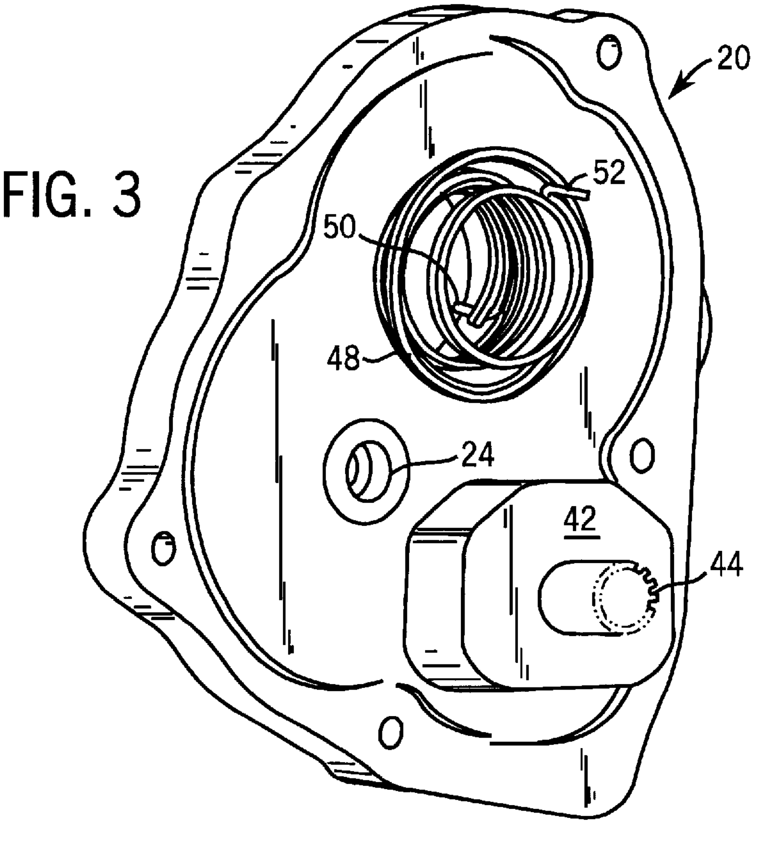

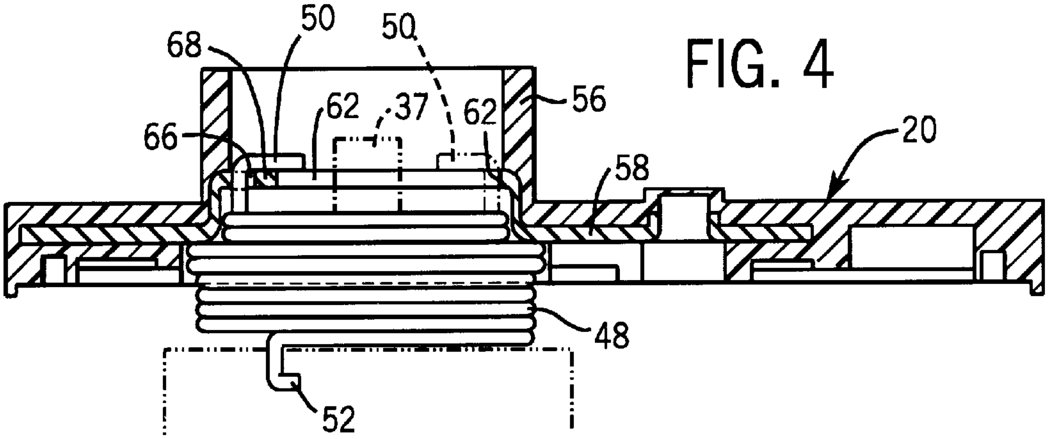
FIG. 4
FIG. 7
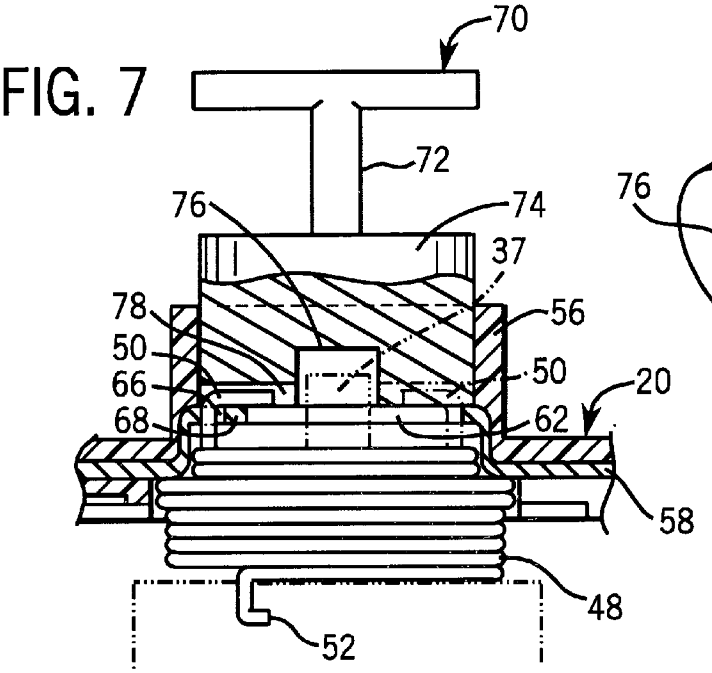
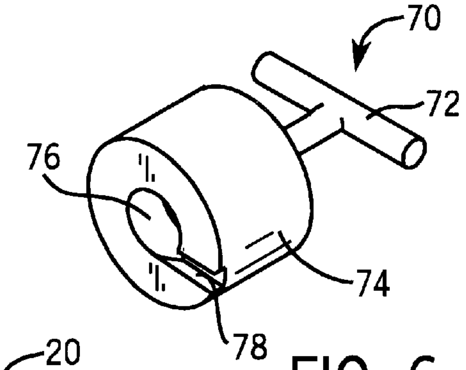
FIG. 6
FIG. 5
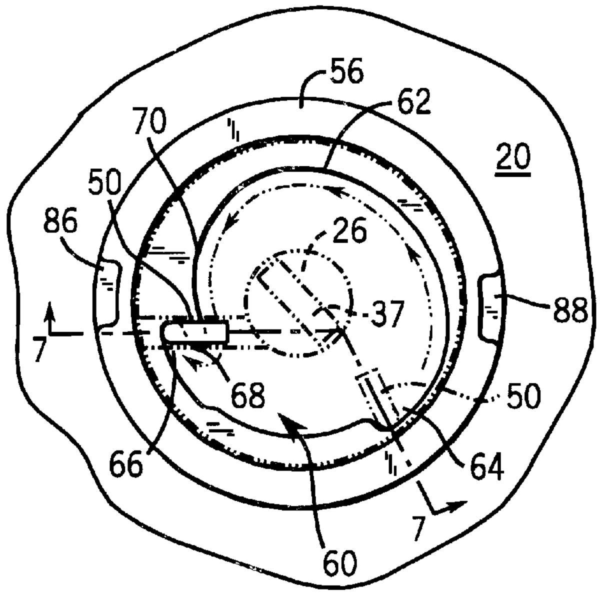

ELECTRONIC THROTTLE RETURN SPRING ASSEMBLY

CROSS-REFERENCE TO RELATED APPLICATIONS (Not Applicable.)

STATEMENT REGARDING FEDERALLY SPONSORED RESEARCH OR DEVELOPMENT (Not Applicable.)

BACKGROUND OF THE INVENTION

The present invention relates to throttles for internal combustion engines, and in particular, to an improved return spring assembly for use with electronic throttles.

Electronic or "drive-by-wire" throttle systems for use in automobiles and other powered by internal combustion engines are well known in the art. In such systems, the acceleration pedal is not mechanically connected to the throttle valve (which controls air volume flowing through the throttle body to the combustion chamber). Instead, acceleration input is electrically coupled to a potentiometer which detects analog input values sent to an electric motor. The electric motor is coupled via a shaft and gear assembly to the throttle valve. The motor actuates the throttle valve to open according to the acceleration input. The acceleration input is typically sampled and averaged periodically to prevent rapid acceleration and deceleration of the engine. A return spring, such as a compression or torsion spring, is connected to the valve shaft to bias the throttle valve closed. When no acceleration input is received, for example, when the ignition is turned off, the throttle valve is closed by the motor and biased closed by the return spring. In the event of loss of motor power, the return spring cooperates with an auxiliary spring to return the throttle valve to an intermediate position, allowing the vehicle to be driven at a low, constant speed. One such electronic throttling system is disclosed in U.S. Pat. No. 4,867,122.

In typical electronic throttling systems, the throttle valve drive assembly is assembled to a throttle body and enclosed by a housing cover. The return spring must be assembled and wound (or tensioned) as needed to bias the throttle valve closed. The return spring must be wound sufficiently to overcome frictional forces in the gear and motor assembly when closing the throttle valve. As it is tensioned, the return spring tends to move and/or uncoil unless secured in place. Consequently, there must be a catch to which the free end of the return spring can be attached once it is wound. Since, the housing cover is not yet assembled this catch is typically a separate component requiring additional assembly, rather than being an integral part of the housing cover. Moreover, since the spring is wound before the housing cover is assembled, the spring can uncoil if not properly held by the catch or if bumped when assembling the housing cover, thereby requiring the spring to be reset. Thus, assembling typical throttle return springs can be difficult and time consuming.

Accordingly, a need exists for an improved throttle return spring assembly that can be easily assembled.

SUMMARY OF THE INVENTION

The present invention provides an electronic throttle return spring assembly that can be completely assembled before the return spring is tensioned. Specifically, the throttle return spring assembly includes a shaft extending along a rotation axis and connected to a valve. The shaft is rotated to adjust the valve as needed to close and open a throat of a throttle. A return spring is positioned concentric with the rotation axis and has a first leg connected to the shaft and a second leg extending axially. A guide, generally concentric with the rotation axis, allows rotation of the return spring about the rotation axis and restricts lateral translation of the return spring. The guide has an arcuate inner radial wall that defines a catch projecting radially inward. Rotating the second leg so as to follow the arcuate wall and engage the catch tensions the return spring.

In one aspect of the invention, the arcuate wall defines a catch groove in which the second leg is disposed. The arcuate wall also defines a relief slot of sufficient radius from the rotation axis such that the second leg can be disposed therein before being tensioned.

In another aspect of the invention, the guide is formed as an integral part of a cover to a gear housing adjacent to the throttle. Preferably, the guide is a rigid structure insert molded in the cover.

In another aspect, a cap covers the guide and the return spring. The cap has fingers that engage with the guide to secure the cap in place. The cap also has a stop member projecting axially and positioned to prevent the second leg from exiting the catch groove and releasing the return spring. The stop member is positioned a distance from an opening of the catch groove less than the diameter of the second leg.

In yet another aspect of the invention, a winding tool may be used to wind the return spring used the throttle body has been assembled. The winding tool includes a handle at one end opposite a body having a central bore and a radial recess. In use, the bore of the winding tool is fit over one end of the shaft so that the radial recess receives the second leg of the return spring. The winding tool can pilot about the shaft in a counter-clockwise direction to move the second leg along the arcuate wall to engage the catch.

In a preferred form, an electronic throttle unit has a throttle chamber with a throat in which is disposed a valve rotatable to close and open the throat and a motor and gear assembly contained in a housing attached to the throttle chamber. The motor and gear assembly drives a shaft connected at one end to the valve and at an opposite end to a return spring having a plurality of windings terminating in an axially extending leg. The guide includes a rigid plate integral with a cover to the housing having an opening through which the return spring leg is disposed. The opening is defined by an inner arcuate surface spiraling radially inward to a catch slot. The guide restricts lateral translation of the return spring. The spring leg can be made to follow the arcuate surface thereby tensioning the return spring to bias the valve closed. Disposing the spring leg in the catch slot maintains the return spring under tension.

Thus, the return spring assembly of the present invention allows the return spring and the throttle body to be assembled before the return spring is wound. The integral guide retains the spring and provides a quick and easy means for winding the return spring to the proper tension. A dust cap covers the return spring to keep out debris and has a stop member which prevents the return spring from disengaging the catch.

These and still other advantages of the present invention will be apparent from the description of the preferred embodiments which follow.

BRIEF DESCRIPTION OF THE DRAWINGS

FIG. 1 is a perspective view of a electronic throttle unit in which an electronic throttle return spring assembly of the present invention can be used;

FIG. 3 is a rear perspective view of a housing cover to which a return spring assembly is secured;

FIG. 4 is a cross-sectional view taken along line 4—4 of FIG. 1 showing the guide disposed between walls of the housing and the return spring tensioned;

FIG. 5 is an enlarged front view showing an arcuate cam profile of a return spring guide and the return spring being wound from an initial position to a wound position;

FIG. 6 is a perspective view of a winding tool used to wind the return spring;

FIG. 7 is a cross-sectional view taken along line 7—7 of FIG. 5 shown with the winding tool of FIG. 6;

DETAILED DESCRIPTION OF THE PREFERRED EMBODIMENTS

Figure 2:
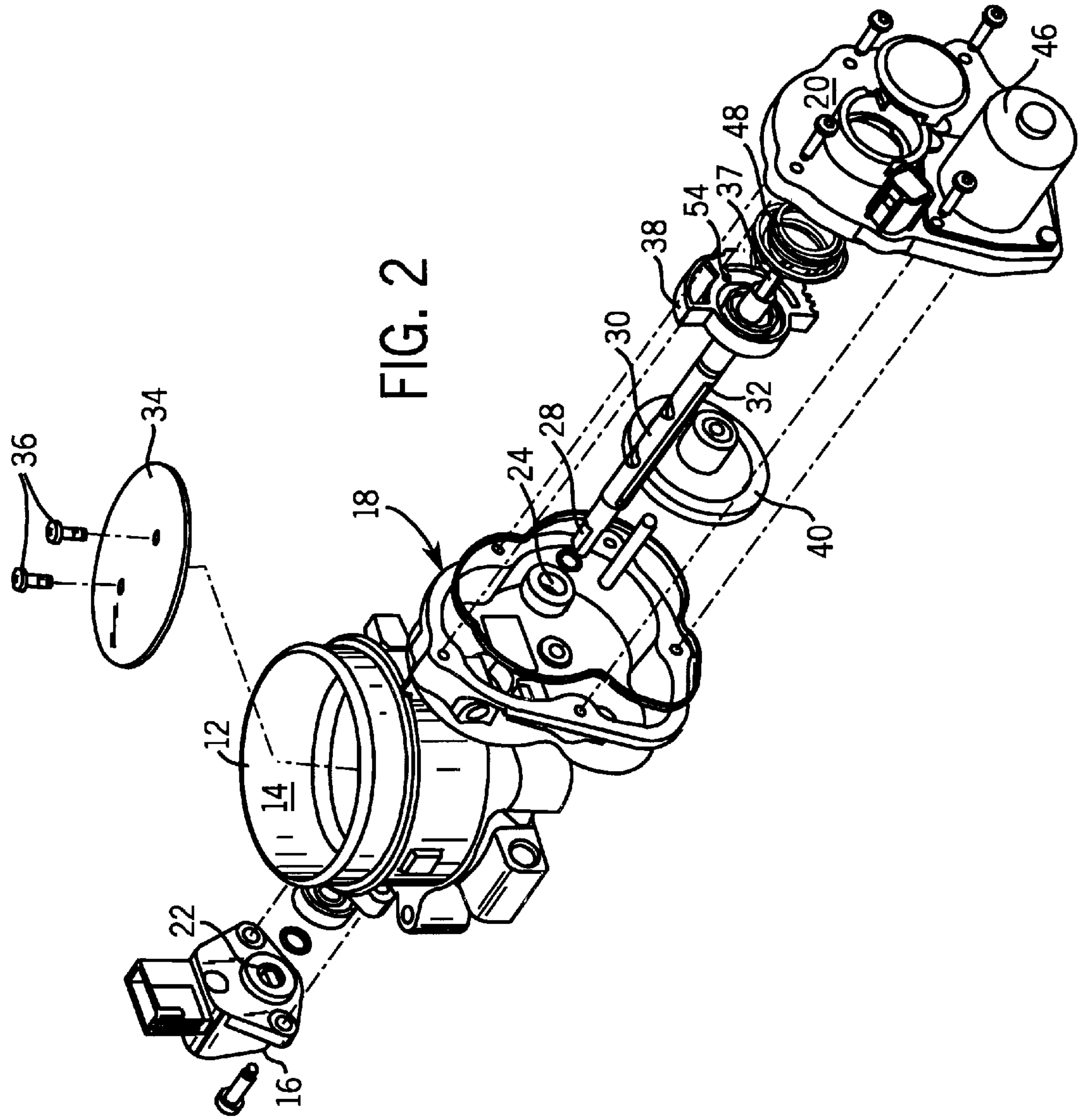
FIG. 2 is an exploded assembly view of the electronic throttle unit of FIG. 1.
Figure 10:
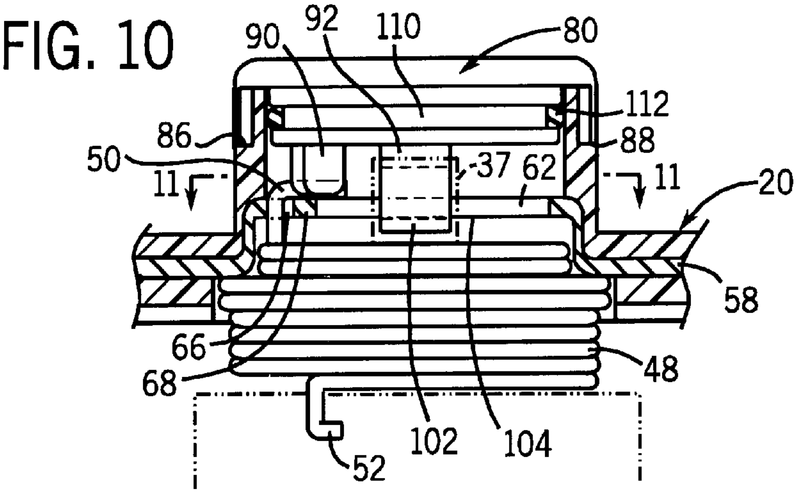
FIG. 10 is a partial cross-sectional view similar to FIG. 7, however, showing the stop member of the dust cap locking the return spring in the wound position.
Figure 11:
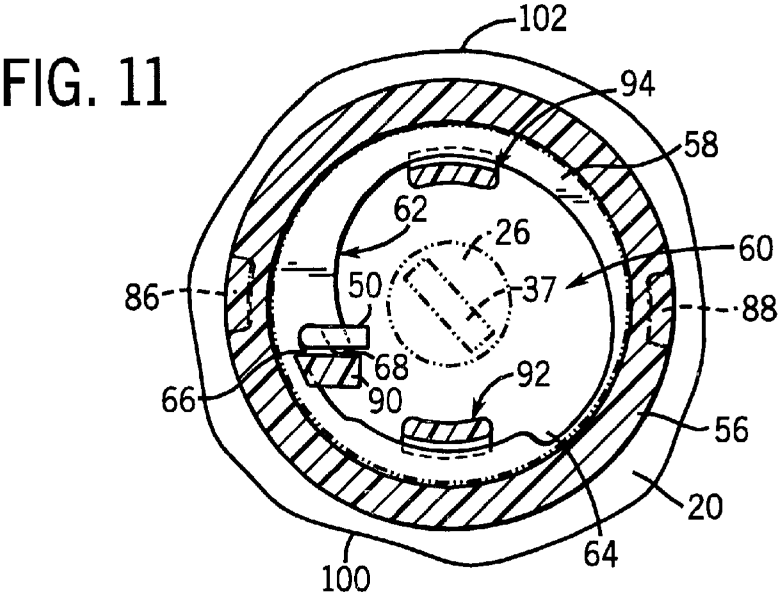
FIG. 11 is a cross-sectional view taken along line 11—11 of FIG. 10.
Figure 8:
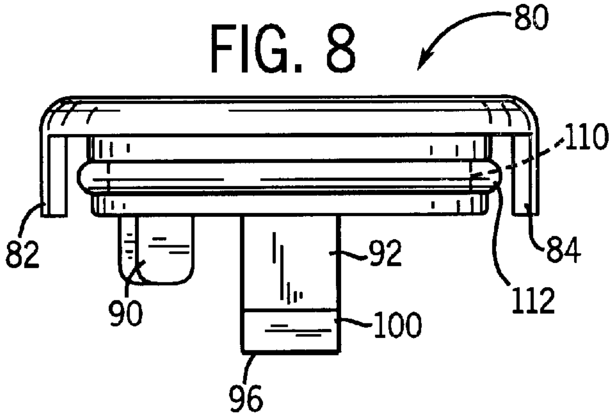
FIG. 8 is a side view of a dust cap attachable to the throttle housing for covering the return spring.
Figure 9:
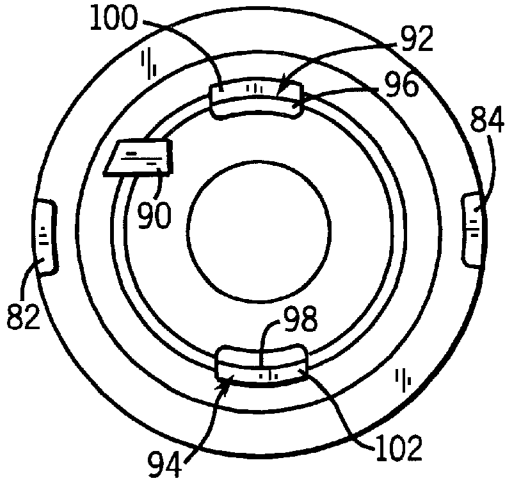
FIG. 9 is a bottom view of the dust cap of FIG. 8.

An electronic throttle unit in which the throttle return spring assembly of the present invention may be used is referred to generally in the drawings by reference numeral 10. Referring to FIGS. 1 and 2, the throttle unit 10 includes as primary components a valve chamber body 12 having a cylindrical bore throat 14 connected in line with an air intake passageway (not shown) and a combustion chamber (not shown). A suitable position sensor 16 is attached at one side of the valve chamber body 12 and a gear housing 18 is attached at an opposite side having a removable cover 20. The position sensor 16 and gear housing 18 include openings 22 and 24, respectively, corresponding to openings (not shown) in the valve chamber body 12 through which a valve shaft 26 is disposed.

In this way a squared end 28 of the shaft 26 engages the position sensor 16 capable of detecting rotational travel of the shaft 26. A middle portion 30 of the shaft 26 includes an axial slot 32 receiving a disk-like valve 34 having a diameter slightly less than the throat 14 of the valve chamber body 12. Two fasteners 36 secure the valve 34 to the shaft 26. At the other squared end 37, a semicircular shaft sprocket 38 is attached to the shaft 26 which engages with a speed reducer sprocket 40. The reducer sprocket 40 is driven by a suitable bi-directional electric motor 42 (see FIG. 3) through engagement with a toothed pinion 44 (see FIG. 3). The motor 42 is disposed within motor housing 46 fastened to the gear housing cover 20.

Referring to FIGS. 1–4, a return spring 48, preferably a helical torsion spring having multiple windings, terminates in front 50 and rear 52 legs extending generally axially and bent radially inward. The rear leg 52 is disposed within a bore 54 in the shaft sprocket 38 (see FIG. 2). The front leg 50 extends into a walled opening 56 in the gear housing cover 20 that is concentric with the valve shaft 26.

Referring to FIGS. 4 and 5, the gear housing cover 20 is insert molded about a rigid guide plate 58 having a cam opening 60 adjacent the walled opening 56. The cam opening 60 is defined by an eccentric arcuate inner wall 62 and includes a relief slot 64 as well as a catch groove 66 adjacent to a radially inwardly extending catch 68. The cam opening 60 spirals inwardly in a counter-clockwise direction from the relief slot 64 to the catch 68, having an increasingly ramped profile 70 proximate the catch 68. The relief slot 64 is at a sufficient radius such that the front leg 50 fits therein before it is tensioned or wound.

To wind the spring, the front leg 50 is rotated counter-clockwise so that it follows the arcuate inner wall 62 past the catch 68 until it comes to rest in the catch groove 66 (as shown by the arrow in FIG. 5). Since the rear leg 52 is fixed at the bore 54, rotating the front leg 50 tensions the return spring 48 to bias the throttle valve 34 closed. When the front leg 50 is positioned to engage the catch 68, the return spring 48 is wound to the proper tension to overcome internal friction within the motor 42 as well as friction between the teeth of the sprockets. While this value can vary without departing from the scope of the invention, the return spring is preferably set at 0.25 foot-lbs.

The return spring 48 can be wound by hand as well as by using a pliers or a specially designed winding tool. Referring to FIG. 6, a preferred winding tool 70 has a T-shaped handle 72 connected to a body 74 having an axial bore 76 and a radial slot 78. Referring to FIG. 7, the axial bore 76 is sized to fit over the squared end 37 of the valve shaft 26 and the radial slot 78 is sized to capture the front leg 50. The winding tool 70 can be piloted about the valve shaft end 37 and the inner diameter of the walled opening 56 in the gear housing cover 20.

Referring to FIGS. 8–11, a circular dust cap 80 covers the walled opening 56 in the gear housing cover 20. The dust cap 80 has axially extending projections 82 and 84 at its outer circumference that are disposed within corresponding recesses 86 and 88 in the wall of the opening 56. This ensures that a downwardly extending axial stop member 90 is aligned with the catch groove 66 at a distance from its opening less than the diameter of the front leg 50 (see FIGS. 8 and 10). This prevents the front leg 50 from inadvertently disengaging from the catch 68. The dust cap 80 also has axial fingers 92 and 94 positioned and sized so that tapered leading edges 96 and 98, respectively, are forced radially inward by the guide plate 58 when the dust cap 80 is assembled. The leading edges terminate in respective lips 100 and 102 that engage a back surface 104 of the guide plate 58 (see FIG. 10) in a snap-fit to hold the dust cap 80 in place. The dust cap 80 is removed by flexing the projections 82 and 84 radially outward so that they are free from the respective recesses 86 and 88 and rotating the dust cap 80 until the fingers 92 and 94 are free from the guide plate 58. The dust cap 80 also has a circumferential groove 110 containing a resilient sealing member 112 that seals the walled opening 56 in the gear housing cover 20 and prevent debris and liquid from entering the housing.

In operation, the electric motor 42 receives acceleration signals processed by an engine control unit (ECU) (not shown) in response to the depression of an accelerator pedal (not shown). Actuation of the motor 42 drives the reducer sprocket 40 which engages the shaft sprocket 38 fixed to the valve shaft 26. The valve shaft 26 rotates the valve 34 clock-wise to open the throat 14 of the throttle and allow air to pass through to the combustion chamber. During acceleration, the motor 42 winds the return spring 48 further due to the engagement of the rear leg 52 and the rotating shaft sprocket 38. The position sensor 16 detects the rotation of the shaft 26 and relays valve position data to the ECU, which processes and uses the valve position data, in conjunction with the acceleration signals, to control the motor 42.

When the accelerator pedal is released, the ECU signals the motor 42 to reverse direction and rotate the valve 34 toward the closed position, which allows the return spring 48 to recoil. When engine ignition is terminated, the motor 42 returns the valve 34 to a fully closed position and the return spring 48 biases it closed. In the event of motor 42 power loss, an auxiliary spring (not shown ) can be used to counteract the return spring 48 to hold the valve 34 at an intermediate position and allow the vehicle to operate a low, constant speed. As such, the return spring 48 is chosen to have a spring rate sufficient to bias the valve 34 closed when the engine is not operating, but which also allows the return spring 48 to cooperate with the auxiliary spring as described. Moreover, preferably, the ECU samples the accelerator signals periodically to smooth the process and prevent abrupt acceleration and deceleration.

The present invention may include other aspects not specifically delineated in the aforementioned preferred embodiments, and the above in no way is intended to limit the scope of the invention. Accordingly, in order to apprise the public of the fall scope of the present invention, reference must be made to the following claims:

What is claimed is:

1. A throttle return spring assembly for use with a throttle having a throat and a valve rotatably fixed within the throat to close and open the throat, the throttle return spring assembly comprising:

a shaft extending along a rotation axis and connected to the valve for rotating the valve so as to open and close the throat of the throttle;

a return spring concentric with the rotation axis and having a first leg connected to the shaft and a second leg extending axially; and a guide generally surrounding the return spring about the rotation axis and restricting translation of the return spring, the guide having an arcuate inner radial wall defining a catch projecting radially inward;

whereby the second leg can be rotated to follow the arcuate surface and engage the catch so as to tension the return spring.

2. The apparatus of claim 1, wherein the arcuate inner radial wall defines an eccentric path.

3. The apparatus of claim 1, wherein the return spring biases the valve to close the throat of the throttle.

4. The apparatus of claim 1, wherein the second leg has a radially extending portion.

5. The apparatus of claim 1, wherein the arcuate inner radial wall defines a catch groove in which the second leg is disposed.

6. The apparatus of claim 5, wherein the arcuate inner radial wall defines a relief slot of sufficient radius from the rotation axis such that the second leg can be disposed therein before being tensioned.

7. The apparatus of claim 1, wherein the guide is formed as an integral part of a cover to a gear housing adjacent the throttle.

8. The apparatus of claim 7, wherein the guide is a rigid structure insert molded in the cover.

9. The apparatus of claim 8, further comprising a cap which covers the guide and the return spring.

10. The apparatus of claim 9, wherein the cap has axial fingers that engage with the guide in a snap-fit.

11. The apparatus of claim 9, wherein the cap has a stop member projecting axially and positioned to prevent the second leg from exiting the catch groove and releasing the return spring.

12. The apparatus of claim 11, wherein the stop member is positioned a distance from an opening of the catch groove less than the diameter of the second leg.

* * * * *